(12) United States Patent
Lu et al.

(10) Patent No.: US 8,530,029 B2
(45) Date of Patent: *Sep. 10, 2013

(54) LOW THERMAL MASS CORDIERITE BODIES AND METHODS FOR MAKING SAME

(75) Inventors: Yanxia Lu, Painted Post, NY (US); Jianguo Wang, Horseheads, NY (US); Yuming Xie, Sugar Land, TX (US)

(73) Assignee: Corning Incorporated, Corning, NY (US)

( * ) Notice: Subject to any disclaimer, the term of this patent is extended or adjusted under 35 U.S.C. 154(b) by 751 days.

This patent is subject to a terminal disclaimer.

(21) Appl. No.: 12/423,272

(22) Filed: Apr. 14, 2009

(65) Prior Publication Data

US 2010/0129599 A1    May 27, 2010

Related U.S. Application Data

(60) Provisional application No. 61/118,168, filed on Nov. 26, 2008.

(51) Int. Cl.
*B32B 3/12* (2006.01)
*C04B 35/195* (2006.01)

(52) U.S. Cl.
USPC ......... 428/116; 501/153; 501/154; 428/315.5

(58) Field of Classification Search
None
See application file for complete search history.

(56) References Cited

U.S. PATENT DOCUMENTS

| | | | |
|---|---|---|---|
| 6,004,501 A * | 12/1999 | Cornelius et al. | 264/631 |
| 6,214,437 B1 | 4/2001 | Beall et al. | 428/116 |
| 2004/0029707 A1 * | 2/2004 | Beall et al. | 501/119 |
| 2007/0119133 A1 * | 5/2007 | Beall et al. | 55/523 |
| 2007/0141301 A1 | 6/2007 | Boorom et al. | 428/116 |
| 2007/0254798 A1 | 11/2007 | Addiego et al. | 501/119 |
| 2008/0004171 A1 | 1/2008 | Melscoet-Chauvel et al. | 501/119 |
| 2008/0032091 A1 * | 2/2008 | Beall et al. | 428/116 |
| 2009/0087613 A1 * | 4/2009 | Lu et al. | 428/117 |
| 2010/0129600 A1 * | 5/2010 | Lu et al. | 428/116 |

FOREIGN PATENT DOCUMENTS

| | | |
|---|---|---|
| WO | WO 01/91882 A1 * | 12/2001 |
| WO | WO 07/064454 | 6/2007 |
| WO | 2008/027219 | 3/2008 |
| WO | 2008/027270 | 3/2008 |
| WO | 2009/005679 | 1/2009 |

* cited by examiner

*Primary Examiner* — David Sample
(74) *Attorney, Agent, or Firm* — John L. Haack

(57) ABSTRACT

Disclosed are cordierite bodies having relatively low thermal mass with good mechanical strength. The porous cordierite bodies generally include a primary cordierite ceramic phase as defined herein. Also disclosed are methods for making and using the cordierite bodies.

7 Claims, 8 Drawing Sheets

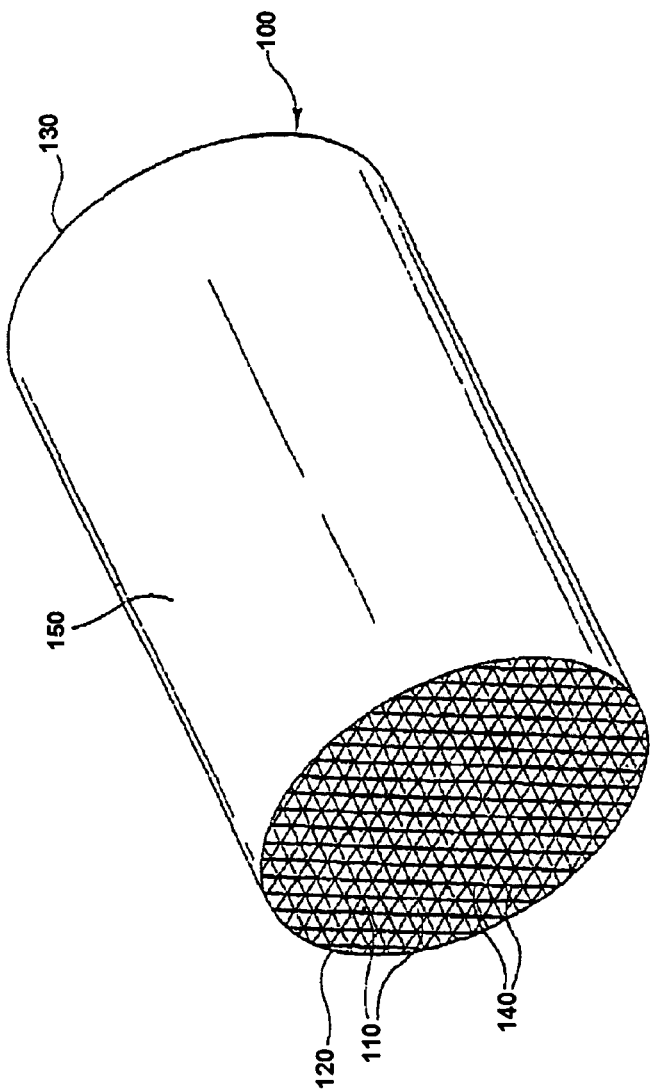

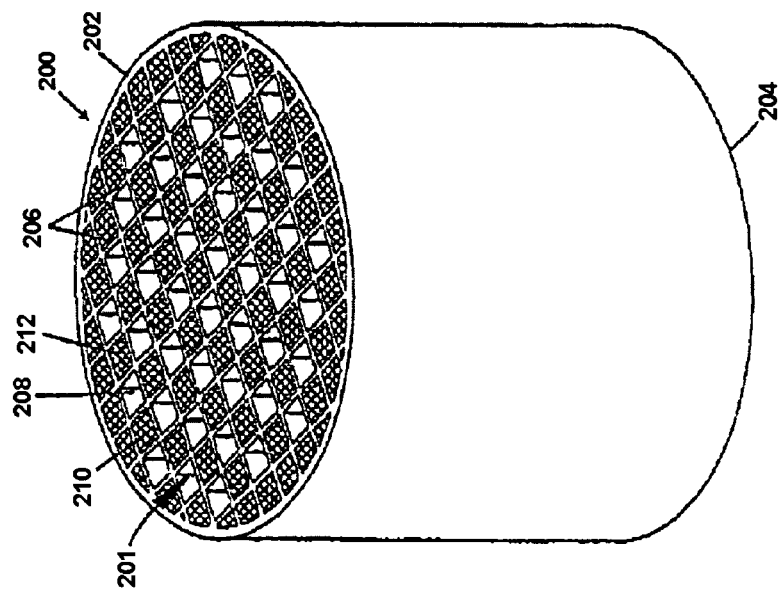

LOW THERMAL MASS CORDIERITE BODIES AND METHODS FOR MAKING SAME

CLAIMING BENEFIT OF PRIOR FILED U.S. APPLICATION

This application claims the benefit of U.S. Provisional Application Ser. No. 61/118,168, filed on Nov. 26, 2008. The content of this document and the entire disclosure of any publication, patent, or patent document mentioned herein is incorporated by reference.

BACKGROUND

The disclosure relates generally to low thermal mass cordierite bodies and methods of making and using same. More particularly, the disclosure provides low thermal mass cordierite ceramics useful in catalytic converter substrates and diesel particulate filters, such as for engine exhaust aftertreatment.

SUMMARY

The disclosure provides cordierite bodies having a relatively low thermal mass, low thermal expansion, good mechanical strength, and a flexible pore structure that makes them excellent choices for catalytic converter substrates or particulate filters (GPFs or DPFs). The disclosure further provides methods for the production of cordierite bodies useful as catalytic converter substrates and gasoline or diesel particulate filters.

BRIEF DESCRIPTION OF THE DRAWINGS

The accompanying drawings illustrate certain embodiments of the disclosure.

FIG. 1 is an isometric view of porous honeycomb substrate.
FIG. 2 is an isometric view of porous honeycomb filter.

DETAILED DESCRIPTION

Figure 3A:
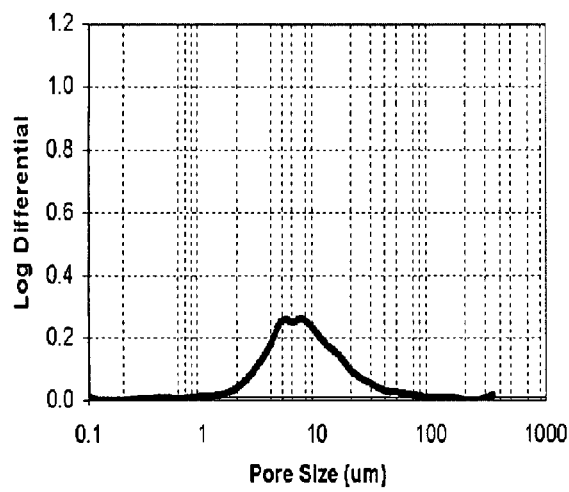
FIG. 3A and FIG. 3B are plots of pore distribution for (A): a comparative cordierite composition, and (B): a cordierite composition of the disclosure with 20% Corn Starch as a pore forming agent.

Various embodiments of the disclosure will be described in detail with reference to drawings, if any. Reference to various embodiments does not limit the scope of the disclosure, which is limited only by the scope of the claims attached hereto. Additionally, any examples set forth in this specification are not limiting and merely set forth some of the many possible embodiments for the claimed invention.

Disclosed are materials, compounds, compositions, and components that can be used for, can be used in conjunction with, can be used in preparation for, or are products of the disclosed method and compositions. These and other materials are disclosed herein, and when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all embodiments of this disclosure including any components of the compositions and steps in methods of making and using the disclosed compositions. Thus, if there are a variety of additional steps that can be performed each of these additional steps can be performed with any specific embodiment or combination of embodiments of the disclosed methods, and that each such combination is specifically contemplated and should be considered disclosed.

Porous cordierite ceramic honeycomb structures are useful for pollution control devices such as catalytic converter substrates, SCR substrates, and certain particulate filters (DPFs or GPFs). Recent trends in exhaust after-treatment for gasoline engines have placed greater demands on catalytic converters. Specifically, converters with lower mass per unit volume (thermal mass) are desired because such converters will heat up faster and begin catalytic conversion of the exhaust sooner, thereby resulting in lower overall emission of pollutants during a driving cycle. Lower thermal mass can be achieved by any combination of lower cell density, thinner walls, or higher porosity, all of which may reduce the strength of the converter substrate, including the thin web high porosity substrate. Achieving high strength in low-mass cordierite honeycombs remains a challenge because of the presence of microcracks, which are necessary for a very low CTE, but which may also reduce the strength of the ceramic. In embodiments, the disclosure provides low thermal mass cordierite bodies with a desired pore structure, controlled pore size, low CTE because of preserving the microcracks, and desired strength, which may be useful for pollution control devices such as catalytic converter substrates, SCR substrates, GPFs and DPFs.

As used herein, "include," "includes," or like terms means including but not limited to.

The singular forms "a," "an," and "the" include plural referents unless the context clearly dictates otherwise. Thus, for example, reference to a "component" includes embodiments having two or more such components, unless the context clearly indicates otherwise.

The term "optional" or "optionally" means that the subsequently described event or circumstance can or cannot occur, and that the description includes instances where the event or circumstance occurs and instances where it does not. For example, the phrase "optional component" means that the component can or can not be present and that the disclosure includes both embodiments including and excluding the component.

Ranges can be expressed herein as from "about" one particular value, to "about" another particular value, or "about"

both values. When such a range is expressed, another embodiment includes from the one particular value, to another particular value, or both. Similarly, when values are expressed as approximations, by use of the antecedent "about," the particular value forms another embodiment. The endpoints of each of the ranges are significant both in relation to the other endpoint, and independently of the other endpoint.

"Weight percent," "wt. %," "percent by weight" or like terms referring to, for example, a component, unless specifically stated to the contrary, refers to the ratio of the weight of the component to the total weight of the composition in which the component is included, expressed as a percentage.

In embodiments, the porous cordierite ceramic bodies of the disclosure have a total porosity (% P) of from about 40% to about 55%, with a median pore size $d_{50}$ of from about 3 microns to about 5 microns, with a thermal mass of less than about 0.28 g/cc, and exhibiting a modulus of rupture strength (MOR) of greater than about 175 pounds per square inch.

Among several advantages provided by various embodiments, the porous bodies exhibit good mechanical strengths and low thermal expansion for a low thermal mass body, making them desirable for use in applications that desire high strength and low thermal mass, such as, for example, auto and diesel exhaust filters. The disclosed compositions provide flexible pore structure design, which can be achieved by implementing pore former into the base composition.

In accordance with a further embodiment of the present disclosure, methods are provided for forming porous cordierite ceramic honeycomb bodies disclosed herein. The method generally comprises mixing inorganic raw materials, an organic binder, additional inorganic or organic pore formers, and a liquid vehicle to form a plasticized batch, forming a green body from the plasticized batch, drying the green body, and firing the body to provide the cordierite ceramic structure.

In embodiments, the porous cordierite ceramic bodies of the disclosure have relatively high levels of porosity, as measured by mercury porosimetry. For example, the bodies of the disclosure can have a total porosity % P of from about 35% to about 55%, such as a total porosity (% P) of the porous body of from about 38% to about 55%, from about 40% to about 50%, and from about 45% to about 55%. To achieve a desired level of thermal mass, in some embodiments the cordierite bodies can have a porosity % P of at least 40%.

In embodiments, the porosity can be characterized by parameters $d_{10}$, $d_{50}$ and $d_{90}$ which relate to the pore size distribution. These quantities are measured by mercury porosimetry. The quantity $d_{50}$ is the median pore diameter based upon pore volume, and is measured in μm; thus, $d_{50}$ is the pore diameter at which 50% of the open porosity of the ceramic honeycomb article has been intruded by mercury. The quantity $d_{90}$ is the pore diameter at which 90% of the pore volume is comprised of pores whose diameters are smaller than the value of $d_{90}$; thus, $d_{90}$ is equal to the pore diameter at which 10% by volume of the open porosity of the ceramic has been intruded by mercury. The quantity $d_{10}$ is the pore diameter at which 10% of the pore volume is comprised of pores whose diameters are smaller than the value of $d_{10}$; thus, $d_{10}$ is equal to the pore diameter at which 90% by volume of the open porosity of the ceramic has been intruded by mercury. The values of $d_{10}$ and $d_{90}$ are also in units of microns.

In embodiments, the median pore size $d_{50}$ of the porous cordierite ceramic bodies can be from about 3 microns to about 10 microns. For example, the ceramic bodies of the disclosure can have a median pore size $d_{50}$ of from about 3 microns to about 7 microns, from about 3 microns to about 5 microns, and from about 3 microns to about 4 microns.

The relative pore size distribution or d-factor ($d_f$) can be expressed by the quantity $(d_{50}-d_{10})/d_{50}$ which describes the width of the distribution of pore sizes finer than the median pore size, $d_{50}$. In embodiments, the porous ceramic bodies can have a pore size distribution d-factor ($d_f$) value less than about 0.4, such as, for example, from about 0.1 to about 0.4.

Another measure of the pore size of a porous ceramic body is the mean pore size, or the average pore size. In embodiments, the porous ceramic bodies can have a mean pore size less than about 10 microns, such as, for example, from about 2 microns to about 6 microns. A diesel particulate filter (DPF), for example, produced from a disclosed ceramic body can have a mean pore size of larger than about 5 microns.

The thermal mass of the disclosed porous ceramic bodies is relatively low, which can, in embodiments, enable fast lift off and slow cooling thereby increasing the efficiency of a catalyst. In embodiments, the porous ceramic bodies can have a thermal mass of less than about 0.28 g/cc, less than about 0.25 g/cc, and less than about 0.20 g/cc, such as, for example, from about 0.1 g/cc to about 0.20 g/cc, and from about 0.2 g/cc to about 0.28 g/cc.

The modulus of rupture (MOR) strength of the porous ceramic body can be measured by the four-point method on a cellular bar, such as either about 0.5×1.0×5.0 inches (1.27× 2.54×12.7 cm) or about 0.25×0.5×2.75 inches (0.635×1.27× 6.985 cm), whose length is parallel to the channels of the body. The MOR is a measure of the flexural strength of the ceramic body. The modulus of rupture MOR can be the modulus of rupture strength measured at 25° C. A high value of MOR is desired because this corresponds to greater mechanical durability of the body and higher thermal durability and thermal shock resistance. A high value of MOR also yields higher values for the thermal shock parameter, ($MOR_{25° C.}/E_{25° C.}$) ($CTE_{500-900° C.}$)$^{-1}$ and strain tolerance, ($MOR_{25° C.}/E_{25° C.}$). In embodiments, the porous ceramic bodies of the disclosure exhibit a modulus of rupture (MOR) strength of greater than about 175 pounds per square inch (1.21 MegaPascal), greater than about 300 pounds per square inch (2.07 MegaPascal), and even greater than about 400 pounds per square inch (2.76 MegaPascal). For example, the porous ceramic bodies can have an MOR strength of from about 175 to about 400 pounds per square inch (from about 1.21 MegaPascal to about 2.76 MegaPascal), from about 180 to about 400 pounds per square inch (from about 1.24 MegaPascal to about 2.76 MegaPascal), and from about 200 to about 350 pounds per square inch (from about 1.38 MegaPascal to about 2.41 MegaPascal).

The durability of the disclosed ceramic bodies under thermal shock conditions can be characterized by the calculation of a thermal shock parameter (TSP). More specifically, TSP is an indicator of the maximum temperature difference a body can withstand without fracturing when the coolest region of the body is at about 500° C. Thus, for example, a calculated TSP of about 558° C. implies that the maximum temperature at some position within the honeycomb body must not exceed 1058° C. when the coolest temperature at some other location within the body is 500° C. The thermal shock parameter is calculated according to the equation TSP=($MOR_{25° C.}/E_{25° C.}$)($CTE_{500-900° C.}$)$^{-1}$ wherein $MOR_{25° C.}$ is the modulus of rupture strength at 25° C., $E_{25° C.}$ is the Young's elastic modulus at 25° C., and $CTE_{500-900° C.}$ is the mean thermal expansion coefficient from 500° C. to 900° C. as measured during heating of a honeycomb sample parallel to the length of the channels. In embodiments, the porous ceramic bodies can exhibit a thermal shock parameter (TSP) of at least about 1,000° C., at least about 1,100° C., and even at least about 1,200° C. For example, the porous ceramic bodies can exhibit a thermal shock parameter (TSP) of from about 900° C. to about 1,200° C., and from about 1000° C. to about 1,100° C.

The coefficient of thermal expansion, CTE, is measured by dilatometry along the axial direction of the specimen, which is the direction parallel to the lengths of the body channels. The value of $CTE_{500\text{-}900°\ C.}$ is the mean coefficient of thermal expansion from 500 to 900° C. Similarly, the value of $CTE_{25\text{-}800°\ C.}$ is the mean coefficient of thermal expansion from 25 to 800° C., and the value of $CTE_{200\text{-}1000°\ C.}$ is the mean coefficient of thermal expansion from 200 to 1000° C., all as measured during heating of the sample. A low value of CTE is desired for high thermal durability and thermal shock resistance. A low value of CTE yields higher values for the thermal shock parameter, $(MOR_{25°\ C.}/E_{25°\ C.})(CTE_{500\text{-}900°\ C.})^{-1}$. In embodiments, the porous ceramic bodies exhibit a coefficient of thermal expansion (CTE) in the axial direction less than about $3.0\times10^{-7}$/° C. across the temperature range of from 25° C. to 800° C. (i.e., $CTE_{25\text{-}800°\ C.}$). For example, the porous ceramic bodies can have a $CTE_{25\text{-}800°\ C.}$ value of from about 0.5 to about 3, and from about 1 to about 3.

The elastic modulus (Young's modulus), E-mod, is measured by a sonic resonance technique either along the axial direction of a 0.5×1.0×5.0 inch (1.27×2.54×12.7 cm) body specimen or along the length of a 0.25×5.0 inch (0.635×12.7 cm) cylindrical rod. The elastic modulus is a measure of the rigidity of the body. The value $E\text{-mod}_{25°\ C.}$ is the elastic modulus of the specimen at or near room temperature before heating of the specimen. $E\text{-mod}_{900°\ C.}$ is the elastic modulus of the specimen measured at 900° C. during heating of the specimen. In embodiments, the porous ceramic bodies exhibit an elastic modulus greater than about 0.3 megapounds per square inch ($2.07\times10^3$ MegaPascal) at ambient conditions. For example, the porous ceramic bodies can exhibit an E-mod greater than about 0.4 megapounds per square inch ($2.76\times10^3$ MegaPascal) and less than about 1 megapounds per square inch ($6.89\times10^3$ MegaPascal), including about 0.5 megapounds per square inch ($3.45\times10^3$ MegaPascal), 0.6 megapounds per square inch ($4.14\times10^3$ MegaPascal), 0.7 megapounds per square inch ($4.83\times10^3$ MegaPascal), 0.8 megapounds per square inch ($5.52\times10^3$ MegaPascal), 0.9 megapounds per square inch ($6.21\times10^3$ MegaPascal), and about 1 megapound per square inch ($6.89\times10^3$ MegaPascal).

Strain tolerance, defined as the modulus of rupture (MOR) strength divided by the elastic modulus (E-mod) can be an indicator of the deformability of a porous ceramic body. In embodiments, the porous ceramic bodies exhibit a strain tolerance (MOR/E-mod) of at least about 400 parts-per-million, at least about 450 parts-per-million, at least about 500 parts-per-million, or even at least about 550 parts-per-million.

The porous cordierite ceramic honeycomb bodies comprise a plurality of porous cell channels extending between a first and second end as shown for example in FIG. 1. The ceramic honeycomb body may have a honeycomb structure that may be suitable for use as, for example, flow-through catalyst substrates or wall-flow exhaust gas particulate filters, such as diesel particulate filters. A typical porous ceramic honeycomb flow-through substrate article 100 according to embodiments of the disclosure is shown in FIG. 1 and includes a plurality of cell channels 110 formed by and at least partially defined by intersecting cell walls 140 (otherwise referred to as "webs") that extend from a first end 120 to a second end 130. The channels 110 are unplugged and flow through them is straight down the channel from first end 120 to second end 130. In one example, the honeycomb article 100 also includes an extruded smooth skin 150 formed about the honeycomb structure, although this is optional and may be formed in later processing as an after applied skin. In embodiments, the porous cell channel walls have a wall thickness less than or equal to about 100 microns, such as, for example, from about 20 microns to about 100 microns. The cell density can be, for example from about 200 to about 900 cells per square inch. In embodiments, the cellular honeycomb structure can consist of a plurality of parallel cell channels 110. In still further embodiments, the plurality of cell channels 110 can include a generally square cross section formed into a honeycomb structure. Alternatively, other cross-sectional configurations may be used in the honeycomb structure as well, including rectangular, round, oblong, triangular, octagonal, hexagonal, or combinations thereof. "Honeycomb" refers to a connected structure of longitudinally-extending cells formed of cell walls, having a generally repeating pattern therein.

FIG. 2 illustrates an exemplary honeycomb wall flow filter 200 according to embodiments of the disclosure. The general structure includes a body 201 made of intersecting porous ceramic walls 206 extending from the first end 202 to the second end 204. Certain cells are designated as inlet cells 208 and certain other cells are designated as outlet cells 210. In the filter 200, certain selected channels include plugs 212. Generally, the plugs are arranged at the ends of the channels and in some defined pattern, such as the checkerboard patterns shown. The inlet channels 208 may be plugged at the outlet end 204 and the outlet channels 210 may be plugged at the inlet end 202. Other plugging patterns may be employed and all of the outermost peripheral cells may be plugged (as shown) for additional strength. Alternately, some of the cells may be plugged other than at the ends. In embodiments, some channels can be flow-through channels and some can be plugged providing a so-called partial filtration design.

In embodiments, the disclosure also provides batch compositions and methods for making the porous cordierite ceramic bodies described above, where a plasticized ceramic forming precursor batch composition is provided by compounding an inorganic powder batch mixture together with an organic binder; and a liquid vehicle. The plasticized batch can further comprise one or more optional constituents including pore-forming agents, plasticizers, and lubricants. The plasticized batch is then formed by shaping, such as by extrusion, into a green honeycomb. These green honeycombs are then dried, such as by microwave or RF drying, and fired in a kiln for a time and at a temperature sufficient to sinter or reaction-sinter the inorganic raw material sources into unitary cordierite ceramic honeycomb bodies. The sintered ceramic bodies exhibit relatively high porosity, controlled pore size, low thermal expansion, and high strength as described above.

The batch composition for forming the porous ceramic honeycomb bodies disclosed herein comprise a mixture of raw cordierite forming components that can be heated under conditions effective to provide a primary sintered phase cordierite composition. The raw cordierite forming batch components can include, for example, a magnesium source; a silica source; and an aluminum source. To that end, in some embodiments, the inorganic ceramic powder batch composition comprises hydrated clay, hydrated talc, an additional silica source other than clay, and an additional alumina source other than clay. Hydrated clay and talc, when present, preferably exhibit a maximum particle size ($D_{100}$) less than about 45 microns.

A "magnesium source" can be any compound that contains magnesium, such as, for example, talc, calcined talc, chlorite, forsterite, enstatite, actinolite, serpentine, spinel, sapphirine, or a magnesium oxide forming source, and like materials. A magnesium oxide forming source can be any magnesium source which, upon heating, converts to magnesium compounds, such as, for example, magnesium oxide, magnesium hydroxide, magnesium carbonate, and like materials. In embodiments, the magnesium source can be a hydrated talc component. For example, the compositions can comprise from about 35% to about 45% by weight hydrated talc, from about 38% to about 42% by weight hydrated talc, and from about 39% to about 41% by weight hydrated talc, relative to the total weight of the inorganic components in the composition.

When the magnesium sources comprise talc, it is preferred for the talc to have a median particle size $D_{50}$ of less than about 30 microns, or even less than about 10 microns. According to embodiments, batch compositions can comprise talc having a median particle size $d_{50}$ of from about 5 microns to about 15 microns, and a maximum particle size $D_{100}$, defined as the particle size wherein 100% of the particles have a smaller size, of from about 20 microns to about 100 microns. Particle size is measured by, for example, a laser diffraction technique, such as by a Microtrac® particle size analyzer. Examples of suitable commercially available talc for use in the present disclosure include microcrystalline Talc from Barretts or Macrosrystalline talc from Luzenac, Greenwood Village, Colo., USA.

In embodiments, the batch compositions can comprise clay present in a weight % amount of from about 10% by weight to about 20% by weight of the total inorganic materials. For example, clay can comprise 12% to 15% of the total weight of inorganic components. Hydrated clay, for example, can be present in a weight percent of from about 12% to about 14% of the total batch composition. Clay, when present in a batch composition, can have a median particle size $D_{50}$ of from about 2 microns to about 8 microns, for example, from about 2 microns to about 6 microns. Exemplary kaolin clays include, for example, non-delaminated kaolin raw clay, having a particle size of about 2-5 microns, and a surface area of about 10-14 $m^2/g$, such as Hydrite PX™ and delaminated kaolin having a particle size of about 1-3 microns, and a surface area of about 13-17 $m^2/g$, such as KAOPAQUE-10™, All of the above named materials are available from Imerys Minerals, Ltd. Other clays suitable for use with the disclosed batch compositions are available from Dry Branch Kaolin, Inc. of Dry Branch, Ga., U.S.A.

In embodiments, an additional alumina source, other than the clay source described above, can also be present in a batch composition. An "alumina" source can be pure alumina, such as α-alumina, or hydrated alumina, such as aluminum trihydrate or Gibbsite; a hydrated alumina can transfer to a transitional alumina such as gamma, theta, chi, or rho alumina upon heating to sufficiently high temperatures. In embodiments, the batch compositions can comprise alumina present in a weight % of from about 20% to about 30% of the total inorganic weight. An alumina forming source, if present, can have a median particle size of less than about 3 microns, and less than that 1 micron. An alumina forming source, when present, can further comprise a maximum particle size $D_{100}$ of less than about 20 microns, such as, for example, less than about 10 microns. In still further embodiments, hydrated alumina can be used in combination with another alumina source; the hydrated alumina, if present, can be a nanoparticle composition, i.e., a composition exhibiting a median particle size $d_{50}$ of from about 1 nanometer to about 100 nanometers. Commercially available aluminum sources can include, for example, the A3000 or A1000SGD available from Alcoa or HVA Alumina available from Almatis, or combinations thereof.

If desired, the alumina source can include a dispersible alumina forming source. A dispersible alumina forming source can be an alumina forming source that can be at least substantially dispersed in a solvent or liquid medium and that can be used to provide a colloidal suspension in a solvent or liquid medium. In embodiments, a dispersible alumina forming source can be a relatively high surface area alumina forming source having, for example, a specific surface area of at least about 50 $m^2/g$. Alternatively, a dispersible alumina forming source can have a specific surface area of at least about 100 $m^2/g$. In embodiments, a suitable dispersible alumina forming source for use with the methods of the disclosure includes the monohydrated alumina ($Al_2O_3.H_2O$, or AlOOH) commonly referred to as boehmite, or pseudoboehmite, which is a member of the ($Al_2O_3.xH_2O$) class. In exemplary embodiments, the dispersible alumina forming source can include the so-called transition or activated aluminas (i.e., aluminum oxyhydroxide and chi, eta, rho, iota, kappa, gamma, delta, and theta alumina) which can contain various amounts of chemically bound water or hydroxyl functionalities. Specific examples of commercially available dispersible alumina forming sources that can be used in the disclosure include Dispal 18N4-80, commercially available from Sasol North America, and alumina sol, called AL20SD from NYACOL Nano Technologies, Inc, Massachusetts, USA.

According to embodiments, a "silicon source" as used herein can include a pure silica other than clay and talc described above. For example, a silica source can be quartz, cristobalite, tridymite, tripoli silica, flint, or other amorphous silica such as fused silica, and like materials, or combinations thereof. In some embodiments, the silica source can be crystalline silica such as quartz or cristobalite. In other embodiments, the silica source can be non-crystalline silica such as fused silica. Pure silica can be provided in a batch composition of from about 15% to about 20% by weight, including, for example, 16% to 19% by weight, 16% to 18% by weight, and 16% to 17% by weight. In embodiments, the silicon source can have a median particle diameter less than 5 microns, or even less than 4 microns, including, for example, median particle sizes of from about 2 microns to about 6 microns. In embodiments, the silicon source can exhibit a maximum particle size $D_{100}$ of from about 10 microns to about 80 microns, including, for example, from about 15 microns to about 25 microns, and less than about 80 microns. A commercially available quartz silica forming source can include, for example, Imsil™ A25, and Imsil™ 8 Silica available from Unimin Corporation.

In further embodiments, a silicon source can include silica forming sources. To that end, silica forming sources can be any compound that forms silica, $SiO_2$, upon heating, such as colloidal silica, sol-gel silica, silicone resin, zeolite, diatomaceous silica, and like materials, or combinations thereof. In still further embodiments, the silica forming source can include a compound that forms free silica when heated, such as for example, silicic acid or a silicon organo-metallic compound.

In embodiments, the plasticized batch composition can further comprise a pore forming agent. The batch compositions can comprise, for example, a pore forming agent present in at least 10% by weight, for example, of from about 10% to about 20% by weight, and from about 20% to about 30% by weight. The weight percent of the pore forming agent can be calculated as a super-addition to the oxide-forming inorganic raw materials. Thus, for example, the addition of 20 parts by weight of a pore forming agent to 100 parts by weight of oxide forming raw materials constitutes 20% addition of pore forming agent. The pore-forming agents can include, for example, graphite, flour, starch, and like materials, or combinations thereof. The starch can include, for example corn, rice, or potato starch. Starch, if present, can have a median particle size of from about 5 microns to about 20 microns, from about 5 microns to about 18 microns, and from about 6 microns to about 15 microns, with a maximum particle size $D_{100}$ of from about 30 microns to about 80 microns. The flour can include walnut shell flour. The median particle diameter of the pore forming agent is selected according to the application of the ceramic honeycomb, and in some embodiments can be from about 1 to about 60 microns. The maximum pore diameter $d_{100}$ of the pore forming agent can be selected according to the application of the ceramic honeycomb and in some embodiments can be less than about 75 microns, such as, for example, less than about 50 microns.

Figure 3B:
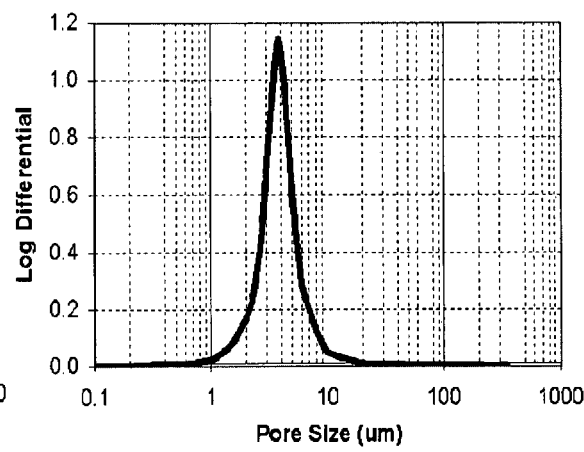

With reference to FIGS. 3A and 3B, the cordierite ceramic bodies of the disclosure can have relatively narrow pore size distributions. Narrow pore size distributions can be achieved, for example, through the use of the pore forming agents disclosed and described herein. For example, with reference to FIG. 3A, a substrate produced from a comparative batch composition without a pore forming agent, the porosity of the resulting cordierite body has been characterized by a total porosity of about 35% and a relatively broad pore size distribution having a median pore size $d_{50}$ of about 7 microns. In contrast, and with reference to FIG. 3B, when a pore former such as corn starch is incorporated as a pore forming agent into an inventive batch composition, a cordierite body can be obtained exhibiting a total porosity of about 49% and a relatively narrow pore size distribution having a median pore size $d_{50}$ of about 4 microns.

Figure 4A:
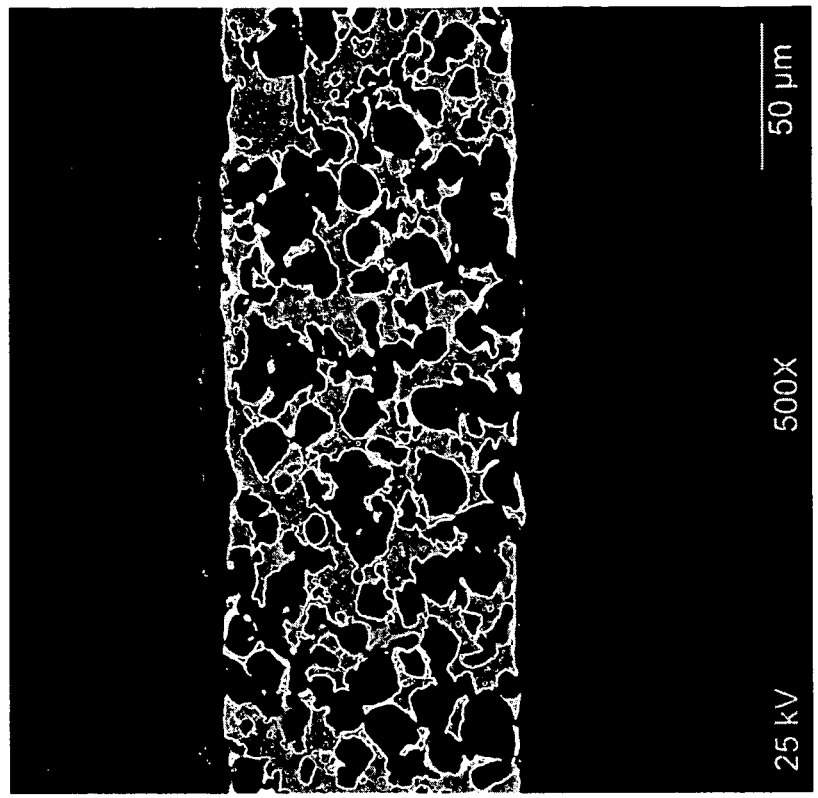
FIG. 4A and FIG. 4B are SEM images of a comparative (A) cordierite body with no pore former and a disclosed (B) cordierite body with pore former.
Figure 4B:
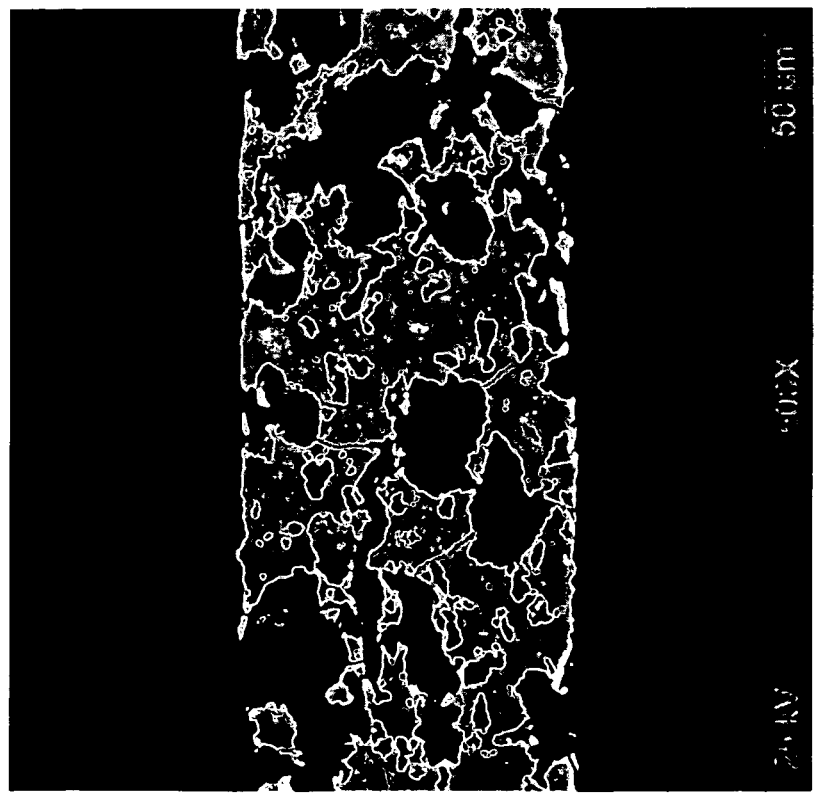

FIGS. 4A and 4B are SEM images of pore structures of two cordierite compositions. FIG. 4A is an SEM image of a comparative cordierite composition without pore former. The pore structure comprises 34% total porosity % P, with a median pore size $d_{50}$ of about 5.3 microns for the sample. FIG. 4B is an SEM image of a cordierite body produced from disclosed composition, which contains 20% corn starch pore former, comprising 49.1% total porosity, with a 4.0 μm median pore size $d_{50}$. As indicated with reference to these figures, the addition of pore former along with the disclosed composition makes the pore distribution more uniform by segregating the cordierite uniformly without changing the median pore size significantly. As a result, the thermal mass is reduced while the strength is maintained.

To provide a plasticized batch composition, the inorganic powder batch composition, including the aforementioned powdered inorganic materials and any pore former, can be compounded with a liquid vehicle, an organic binder, and one or more optional forming or processing aids. Exemplary processing aids or additives can include lubricants, surfactants, plasticizers, and sintering aids. Exemplary lubricants can include hydrocarbon oil, tall oil, or sodium stearate. An exemplary commercially available lubricant includes Liga GS, available from Peter Greven Fett-Chemie.

The organic binder component can include water soluble cellulose ether binders such as methylcellulose, hydroxypropyl methylcellulose, methylcellulose derivatives, or a combination thereof. Notable examples include methylcellulose and hydroxypropyl methylcellulose. In embodiments, the organic binder can be present in the composition as a super addition in an amount in the range of from about 1.0 weight percent to about 8.0 weight percent of the inorganic powder batch composition, or, in an amount of from about 2 weight percent to about 6 weight percent of the inorganic powder batch composition. The incorporation of the organic binder into the batch composition can further contribute to the cohesion and plasticity of the composition. The improved cohesion and plasticity can, for example, improve the ability to shape the mixture into a body.

A preferred liquid vehicle for providing a flowable or paste-like consistency to the inventive compositions can be, for example, water, although other liquid vehicles exhibiting solvent action with respect to suitable temporary organic binders can be used. The amount of the liquid vehicle component can be varied in order to impart desirable handling properties and compatibility with the other components in the ceramic batch mixture. The liquid vehicle content can be present as a super addition in an amount of from about 3% to about 30% by weight of the inorganic powder batch composition, or in the range of from about 5% to about 20% by weight of the inorganic powder batch composition. Minimization of liquid components in the disclosed compositions can lead to further reductions in undesired drying shrinkage and crack formation during the drying process.

In embodiments, the plasticized batch compositions, under paste conditions, can exhibit a yield stress value from about 120 to about 200 kilopascals, or more from about 130 to about 180 kilopascals, and a Young's modulus value from about 2 to about 5 megapascals, or from about 2.2 to about 4.0 megapascals. The Young's modulus, for example, can be a determinate of the stiffness of a paste derived from the batch compositions, which can be referred to as the green strength. The strain tolerance at peak (prior to crack) can be, for example, from about 10% to about 20%, or from about 13% to about 18%. The strain tolerance can determine how well a paste can accommodate a shape change from a billet shape to a honeycomb shape. A desirable combination can be an embodiment with a high strain tolerance at a high Young's modulus. Such an embodiment can have sufficient green strength to allow for the easy shaping of the honeycomb body.

The honeycomb substrate such as shown in FIG. 1 can be formed from the plasticized batch according to any conventional process suitable for forming honeycomb monolith bodies. For example, in embodiments a plasticized batch composition can be shaped into a green body by any known conventional ceramic forming process, such as, e.g., extrusion, injection molding, slip casting, centrifugal casting, pressure casting, dry pressing, and like processes. In embodiments, extrusion can be accomplished using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The resulting honeycomb body can then be dried, and subsequently fired under conditions effective to convert the formed green composition into a primary sintered phase ceramic composition. Conditions effective for drying the formed green body functionally can include those conditions capable of removing at least substantially all of the liquid vehicle present within the green composition. As used herein, "at least substantially all" includes the removal of at least about 95%, at least about 98%, at least about 99%, or at least about 99.9% of the liquid vehicle present prior to drying, including intermediate values and ranges. Exemplary and non-limiting drying conditions suitable for removing the liquid vehicle include heating the green honeycomb substrate at a temperature of at least about 50° C., at least about 60° C., at least about 70° C., at least about 80° C., at least about 90° C., at least about 100° C., at least about 110° C., at least about 120° C., at least about 130° C., at least about 140° C., or even at least about 150° C. for a period of time sufficient to at least substantially remove the liquid vehicle from the green composition. In embodiments, the conditions effective to at least substantially remove the liquid vehicle comprise heating the formed green body to at least about 60° C. Further, the heating can be provided by any known method, including for example, hot air drying, RF, microwave drying, or a combination thereof.

With reference again to FIG. 2, either before or after the green body has been fired, a portion of the cells 210 of a formed monolithic honeycomb 200 can be plugged at the inlet end 202 with a paste having the same or similar composition to that of the body 201. The plugging can be performed only at the ends of the cells and form plugs 212 having a depth of about 5 to about 20 mm, although this can vary. A portion of the cells on the outlet end 204 but not corresponding to those on the inlet end 202 may also be plugged in a similar pattern. Therefore, each cell can be plugged only at one end. One exemplary arrangement is to have every other cell on a given face plugged as in a checkered pattern as shown in FIG. 2. Further, the inlet and outlet channels can be any desired shape. However, in the exemplified embodiment shown in FIG. 2, the cell channels are square in cross-sectional shape.

With reference again to FIG. 1, a ceramic article 100 formed from the cordierite forming precursor compositions, according to embodiments of the disclosure, can include a plurality of cell channels 110 separated by and at least partially defined by porous cell channel walls 140 (otherwise referred to as "webs") that extend from a first end 120 to a second end 130. In embodiments, a plurality of cell channels separated by porous cell channel walls can have a wall thickness greater than about 25 microns, greater than about 75 microns, and, for example, from about 25 microns to about 100 microns.

The formed ceramic bodies can then be fired under conditions effective to convert the inorganic powder batch composition into a primary sintered phase cordierite composition. Exemplary firing conditions can comprise heating the honeycomb green body at a maximum firing temperature from about 1380 to 1440° C. for about 4 to about 40 hours to form a body with at least 80% cordierite. For example, the disclosed methods can provide conditions effective to form a porous cordierite ceramic honeycomb body by firing the formed green body at a temperature of from about 1,400° C. to about 1,420° C. for a period of time from about 6 to about 10 hours. The total cycle time from room temperature to maximum temperature and back to room temperature is in the range of 40 to 60 hours. The holding time at maximum temperature can be, for example, at least 5 hours, such as, for example, from about 6 to about 10 hours.

It is understood that the disclosed methods can be used in combination with the disclosed compositions, and that the disclosed embodiments can be provided by the disclosed methods.

EXAMPLES

To further illustrate the principles of the disclosure, the following examples provide those of ordinary skill in the art with a complete disclosure and description of how the cordierite honeycomb bodies and claimed methods are made and evaluated. Efforts have been made to ensure accuracy with respect to numbers (e.g., amounts, temperatures, etc.); however, some errors and deviations may have occurred. Unless indicated otherwise, parts are parts-by-weight, temperature is ° C. or is at ambient temperature, and pressure is at or near atmospheric.

Table 1 provides a listing of exemplary cordierite forming precursor batch composition components and relative amounts thereof for preparation of a comparative and inventive cordierite batch composition. In accordance with the disclosure and as further exemplified below, the exemplary inventive batch composition is suitable for producing substrates for both auto and diesel applications. A batch composition according to Table 1 can be provided by conventional methods. For example, the raw materials can be compounded with a liquid vehicle, an organic binder, and one or more optional forming or processing aids.

TABLE 1

| Raw Material | Comparative Batch (wt. %) | Inventive Batch (wt. %) |
| --- | --- | --- |
| Talc 1 | 40.5 | — |
| Talc 2 | — | 41.07 |
| Hydrated Clay | 14.9 | 13.69 |
| Calcined Clay | 19.6 | — |
| Hydrated Alumina | 2.0 | 3.09 |
| Alumina Coarse | 13.9 | — |
| Alumina Fine | 3.1 | 25.24 |
| Silica Coarse | 6.0 | — |
| Silica Fine | — | 16.91 |
| Binder | 2.8 | 3.5 |
| Lubricant Solid | 0.3 | — |
| Oil 1 | 0.5 | 0.5 |
| Oil 2 | 4.5 | 3 |
| Pore forming agent(s) | — | 10-30 |

Table 2 provides properties of exemplary porous cordierite ceramic bodies manufactured from the batch compositions set forth in Table 1. In each example, a cordierite body was provided with a given cell number and web thickness, according to a disclosed method. Properties of each example were measured using conventional methods, as discussed hereinabove. The properties of the comparative example C1 were obtained from a sample batch composition according to the comparative batch composition of Table 1 and were thus achieved without the use of a pore forming agent. The properties of inventive examples I1 through I4, were obtained from sample batch compositions prepared according to the inventive batch composition of Table 1 and were thus achieved with the use of a pore forming agent. In each of inventive examples I1 through I4, either rice starch (RS) or corn starch (CS) was used in varying percentages as the pore former. It was found that the inventive bodies I1 through I4 exhibit porosity in the range of from about 39% to about 50% while also exhibiting about a relative reduction in thermal mass of about 9% to about 25% less than the thermal mass of the comparative example C1. It was also found that the strengths, strain tolerance, and thermal shock parameter (TSP) of the inventive samples were higher despite porosity increases.

TABLE 2

| Property | C1 | I1 | I2 | I3 | I4 |
| --- | --- | --- | --- | --- | --- |
| Pore Former | 0% | 10% Rice | 10% Corn | 20% Rice | 20% Corn |
| Cell#/web thickness (mil) | 600/3.6 | 610/3.8 | 614/3.9 | 616/3.6 | 619/3.7 |
| Thermal Mass (g/cc) | 0.282 | 0.273 | 0.266 | 0.242 | 0.224 |

TABLE 2-continued

| Property | C1 | I1 | I2 | I3 | I4 |
|---|---|---|---|---|---|
| Porosity | 33.4% | 39.1% | 42.4% | 43.5% | 49.1% |
| MPS (μm) | 6.5 | 3.1 | 3.9 | 3.3 | 4.0 |
| CTE $(10^{-6})_{25\text{-}800°\ C.}$ | 2.4 | 2.8 | 1.7 | 2.8 | 1.3 |
| MOR (psi) | 200 | 335 | 308 | 256 | 216 |
| MOR normalized to 600/3.5 (psi) | 195 | 307 | 275 | 246 | 202 |
| MOR normalized to 600/3.5 (MegaPascal) | 1.34 | 2.12 | 1.90 | 1.70 | 1.39 |
| Thermal mass normalized to 600/3.5 (g/cc) | 0.275 | 0.250 | 0.237 | 0.233 | 0.208 |
| E-mod $(10^6)$ psi | 0.471 | 0.611 | 0.637 | 0.495 | 0.412 |
| E-mod (MegaPascal) | $3.25 \times 10^3$ | $4.21 \times 10^3$ | $4.39 \times 10^3$ | $3.41 \times 10^3$ | $2.84 \times 10^3$ |
| Strain tolerance (ppm) | 424 | 529 | 484 | 518 | 524 |
| TSP (° C.) | 922 | 1022 | 1053 | 1022 | 1092 |

Table 3 provides properties of additional examples wherein the comparative and inventive compositions of Table 1 were used to manufacture cordierite honeycombs having approximately 600 cells per square inch and wall thicknesses of either at least 2 mils or at least 3 mils. The properties of the examples of Table 3 were measured using conventional methods. It was found that the thermal mass of the inventive parts was reduced to at least about 10-30% relative to the thermal mass of the comparative sample C2. It was also found that the strength of the inventive parts is higher than the strength of comparative honeycomb C2. While not wishing to be bound by theory, this result is believed to be attributed to the resulting pore structure of the inventive cordierite forming precursor batch compositions.

TABLE 3

| | C2 | I5 | I6 | I7 | I8 | I9 | I10 |
|---|---|---|---|---|---|---|---|
| Cell#/web (mil) | 591/3.4 | 614/3.8 | 542/2.9 | 610/3.5 | 549/2.9 | 621/3.3 | 622/4.0 |
| Thermal mass (g/cc) | 0.258 | 0.259 | 0.191 | 0.221 | 0.167 | 0.179 | 0.213 |
| Porosity | 35.2% | 42.5% | 41.6% | 46.7% | 49.2% | 54.8% | 55.2% |
| MPS (μm) | 6.7 | 2.5 | 2.7 | 3.4 | 3.5 | 3.0 | 3.7 |
| CTE $(10^{-7}/°\ C.)_{25\text{-}800°\ C.}$ | 1.9 | 1.8 | 2.2 | 0.8 | 1.5 | 2.9 | 2.5 |
| E-mod $(10^6$ psi) | 0.47 | 0.609 | 0.46 | 0.471 | 0.349 | 0.353 | 0.377 |
| E-mod $(10^3$ MegaPascal) | 3.24 | 4.20 | 3.17 | 3.25 | 2.41 | 2.43 | 2.60 |
| MOR (psi) | 211 | 327 | 240 | 278 | 196 | 228 | 260 |
| MOR (MegaPascal) | 1.45 | 2.25 | 1.65 | 1.92 | 1.35 | 1.57 | 1.79 |
| MOR normalized to 600/2.5 (psi) | 158 | 216 | 218 | 200 | 177 | 171 | 163 |
| MOR normalized to 600/2.5 (MegaPascal) | 1.09 | 1.49 | 1.50 | 1.38 | 1.22 | 1.18 | 1.12 |
| Thermal mass normalized to 600/2.5 (g/cc) | 0.193 | 0.171 | 0.174 | 0.159 | 0.151 | 133 | 135 |
| Strain tolerance $(10^{-6})$ | 449 | 536 | 522 | 591 | 561 | 645 | 689 |
| TSP (° C.) | 990 | 1096 | 1064 | 1208 | 1147 | 1146 | 1244 |

Figure 5:
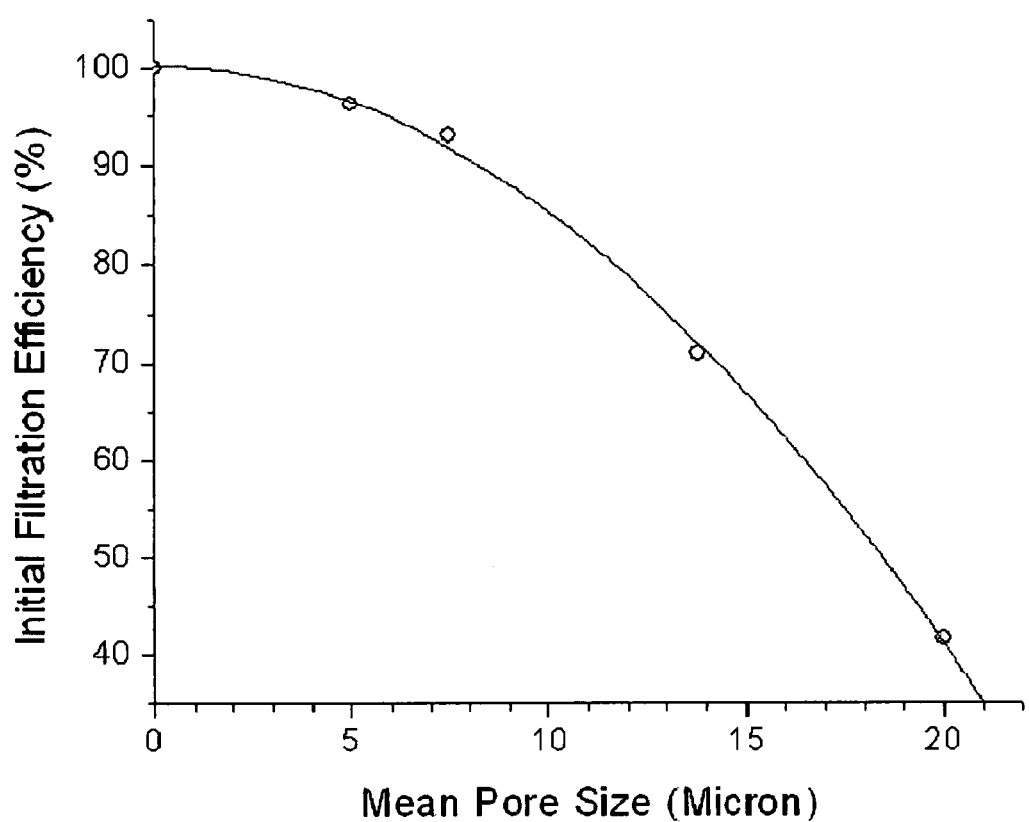
FIG. 5 is a plot of initial filtration efficiency versus mean pore size (micron) for a diesel precursor batch composition.

The disclosed cordierite bodies were also tested for application as gasoline particulate filters (GPFs), for which a suitable microstructure window was identified based on a 5.66"×6"DPF (14.376×15.24 cm) initial filtration efficiency and backpressure results, as shown in FIG. 5. In embodiments for use with this application with an initial filtration efficiency of 90% or above, the calculated wall flow GPF microstructure can have a mean pore size <6 microns, a porosity <50%, and a web thickness >200 microns with narrow pore size distribution ($d_f$<0.4).

Figure 6:
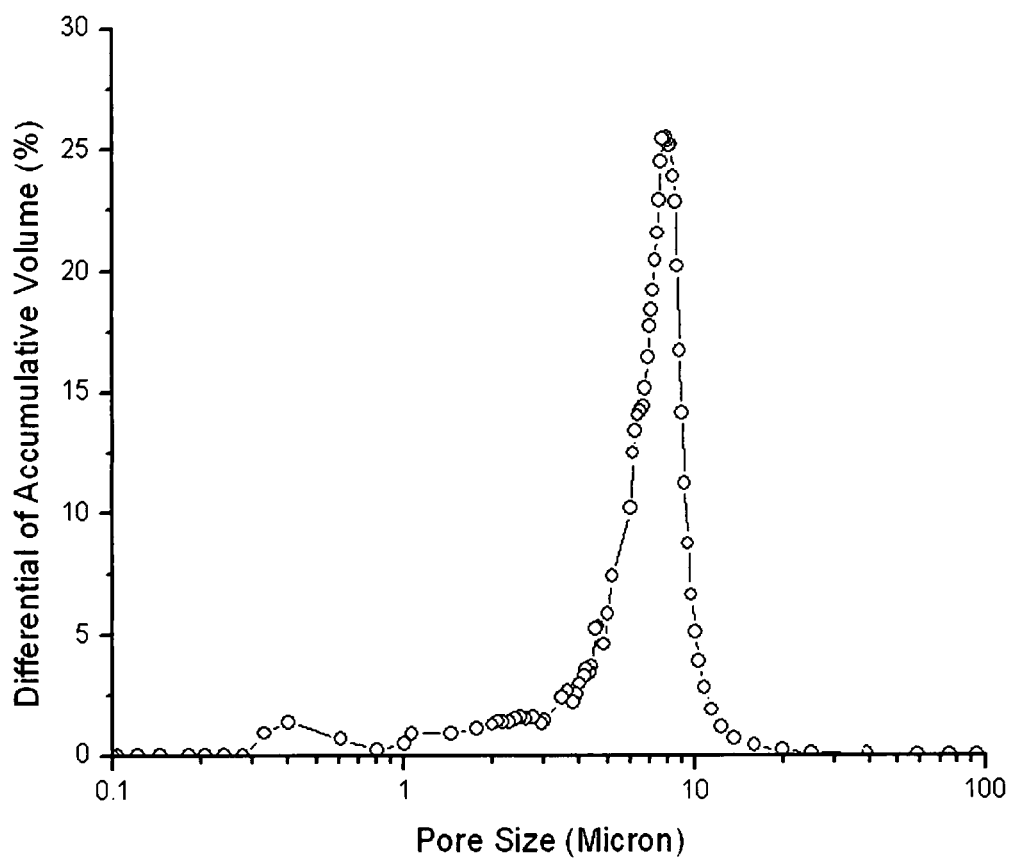
FIG. 6 is a plot of pore size distribution for an exemplary body for use with GPF applications.
Figure 7A:
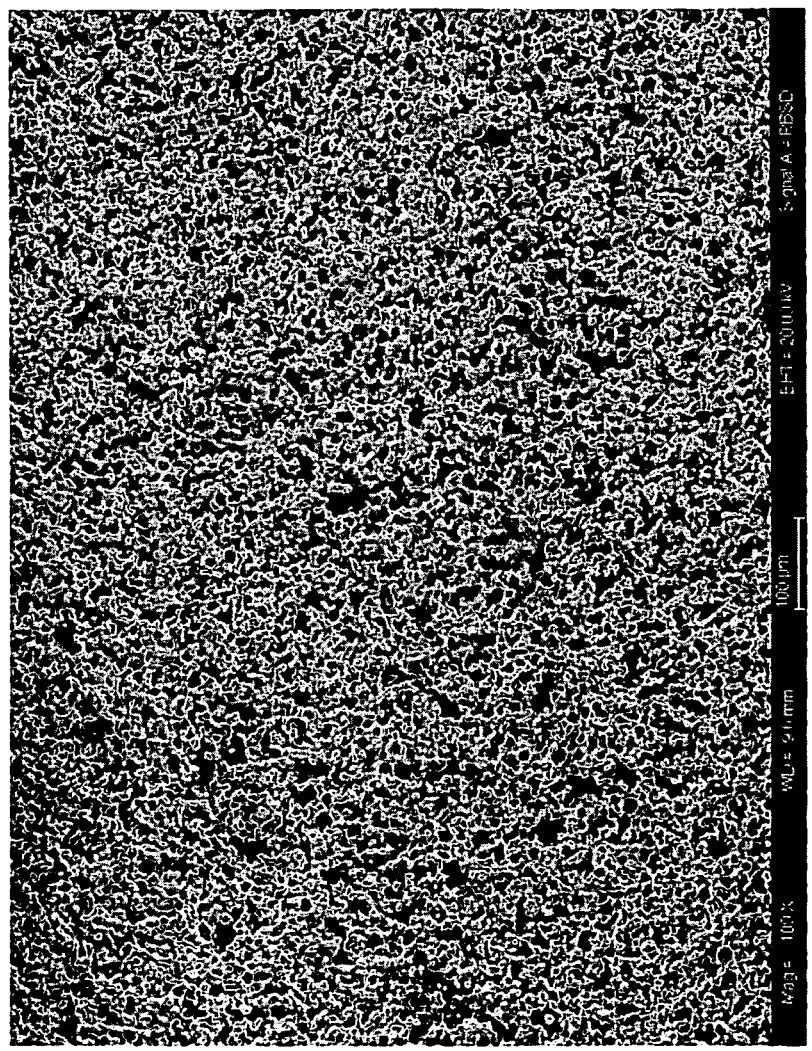
FIGS. 7A and 7B are SEM images of the internal (7B) and surface (7A) pore structures of an exemplary body for use with GPF applications.
Figure 7B:
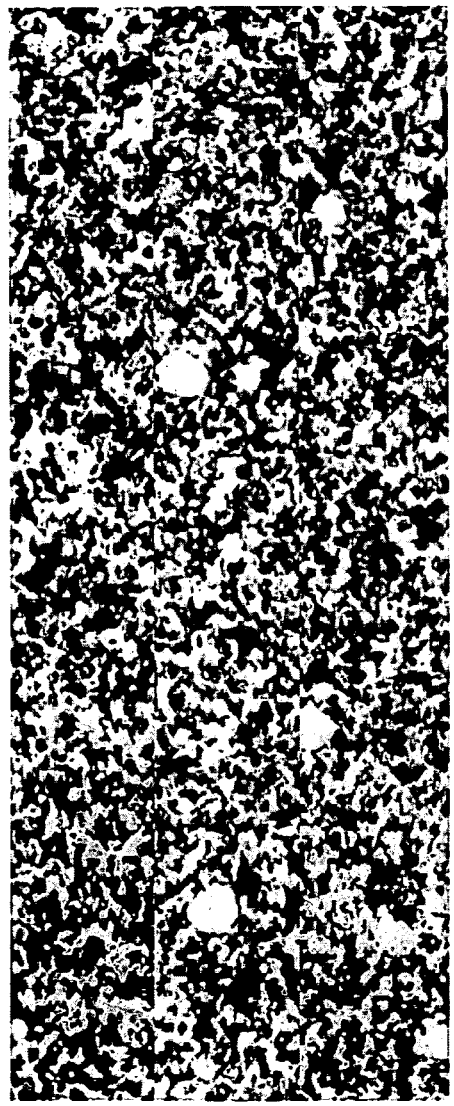

It should be appreciated that by substantially eliminating large pores, a 5.66"×6" DPF (14.376×15.24 cm) can achieve a high initial filtration efficiency of 90% and above. An exemplary inventive batch composition used to prepare the 5.66"×6" DPF (14.376×15.24 cm) is listed as in Table 4. With reference to FIG. 6, the exemplary body exhibits a porosity of 56%, a $d_{50}$=7.86 μm, a $d_{10}$=5.13 μm, and a $d_{90}$=12.22 μm. The surface and internal pore structures of the resulting filter are shown in FIGS. 7A and 7B.

TABLE 4

| Material | Wt. % | Size (μm) |
|---|---|---|
| INORGANICS | | |
| Talc 4019 | 41.54 | 7-8 |
| Silica-Imsil A25 | 16.59 | 4.8 |
| Alumina-A3000 FL | 25.53 | 1.8 |
| Alumina, Boehmite - Dispal 18N4-80 | 3 | <1 |
| Totals | 100.51 | |
| PORE FORMERS | | |
| Corn Starch | 20 | 15 |

The disclosure has been described with reference to various specific embodiments and techniques. However, many variations and modifications are possible while remaining within the spirit and scope of the disclosure.

What is claimed is:

1. A porous fully microcracked cordierite ceramic substrate body, comprising:
   a total porosity (% P) of from about 40 to about 55%;
   a median pore size ($d_{50}$) of from about 3 microns to about 8 microns, the pore size distribution being characterized by a $d_f$ value less than about 0.4;
   a thermal mass of less than about 0.28 g/cc;
   a thermal shock parameter (TSP) of at least about 1,000° C.;
   a $CTE_{25-800°C}$ value of from about 0.5 to about $3\times10^{-7}$/C.; and
   a modulus of rupture strength (MOR) of greater than about 1.10 MegaPascal,
   wherein the body is a honeycomb having a plurality of cell channels separated by porous cell channel walls having a wall thickness less than or equal to about 100 microns.

2. The body of claim 1, wherein the thermal mass is less than about 0.25 g/cc.

3. The body of claim 2, wherein the modulus of rupture strength is greater than about 2.07 MegaPascal.

4. The body of claim 1, wherein the thermal mass is less than about 0.15 g/cc.

5. The body of claim 4, wherein the modulus of rupture strength is greater than 1.38 MegaPascal.

6. The body of claim 1, further having a thermal shock parameter (TSP) of at least about 1,100° C.

7. The body of claim 1, further having a thermal shock parameter (TSP) of at least about 1,200° C.

* * * * *